United States Patent
Bernard et al.

(10) Patent No.: US 7,516,069 B2
(45) Date of Patent: Apr. 7, 2009

(54) MIDDLE-END SOLUTION TO ROBUST SPEECH RECOGNITION

(75) Inventors: Alexis P. Bernard, Palisades, CA (US); Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 831 days.

(21) Appl. No.: 10/823,059

(22) Filed: Apr. 13, 2004

(65) Prior Publication Data

US 2005/0228662 A1 Oct. 13, 2005

(51) Int. Cl.
*G10L 15/14* (2006.01)
(52) U.S. Cl. ...................................... 704/233
(58) Field of Classification Search ................... 704/233
See application file for complete search history.

(56) References Cited

U.S. PATENT DOCUMENTS

| | | | | |
|---|---|---|---|---|
| 4,811,404 | A * | 3/1989 | Vilmur et al. ............. | 381/94.3 |
| 4,897,878 | A * | 1/1990 | Boll et al. ................ | 704/233 |
| 5,450,522 | A * | 9/1995 | Hermansky et al. ....... | 704/200.1 |
| 6,167,133 | A * | 12/2000 | Caceres et al. .......... | 379/406.13 |
| 6,263,307 | B1 * | 7/2001 | Arslan et al. ............. | 704/226 |
| 6,445,801 | B1 * | 9/2002 | Pastor et al. ............. | 381/94.2 |
| 6,446,038 | B1 * | 9/2002 | Bayya et al. ............. | 704/232 |
| 6,678,657 | B1 * | 1/2004 | Bruckner et al. ......... | 704/240 |
| 7,058,572 | B1 * | 6/2006 | Nemer .................... | 704/226 |
| 7,236,930 | B2 * | 6/2007 | Bernard et al. ........... | 704/233 |
| 2002/0035471 | A1 * | 3/2002 | Breton .................... | 704/233 |
| 2004/0064307 | A1 * | 4/2004 | Scalart et al. ............ | 704/205 |
| 2004/0213419 | A1 * | 10/2004 | Varma et al. ............. | 381/92 |

OTHER PUBLICATIONS

Tohkura, Yoh'Ichi. "A Weighted Cepstral Distance Measure for Speech Recognition," IEEE Transactions on Acoustics, Speech, and Signal Processing, vol. ASSP-35, No. 10, Oct. 1987, pp. 1414-1422.*
Bernard, et al.; "Joint Channel Decoding—Viterbi Recognition for Wireless Applications;" in Proceedings of Eurospeech, Sep. 2001, vol. 4; pp. 2703-2706; {abernard, alwan}@icsl.ucla.edu.
Bernard, et al.; "Speech Transmission Using Rate-Compatible Trellis Codes and Embedded Source Coding;" IEEE Transactions on Communications, vol. 50, No. 2, Feb. 2002; pp. 309-320.
Bernard; "Source and Channel Coding for Speech Transmission and Remote Speech Recognition;" Ph.D. Thesis; University of California, Los Angeles, 2002; 200 Pages.
Cui, et al.; "A Noise-Robust ASR Back-End Technique Based on Weighted Viterbi Recognition;" in Proceedings of Eurospeech, Sep. 2003; pp. 2169-2172; {xdcui, abernard, alwan}@icsl.ucla.edu.

* cited by examiner

*Primary Examiner*—Susan McFadden
(74) *Attorney, Agent, or Firm*—Wad J. Brady, III; Frederick J. Telecky, Jr.

(57) ABSTRACT

A method for performing time and frequency Signal-to-Noise Ratio (SNR) dependent weighting in speech recognition is described that includes for each period t estimating the SNR to get time and frequency SNR information $\eta_{t,f}$; calculating the time and frequency weighting to get $\gamma_{t,f}$; performing the back and forth weighted time varying DCT transformation matrix computation $MG_t M^{-1}$ to get $T_t$; providing the transformation matrix $T_t$ and the original MFCC feature $o_t$ that contains the information about the SNR to a recognizer including the Viterbi decoding; and performing weighted Viterbi recognition $b_j(o_t)$.

12 Claims, 1 Drawing Sheet

MIDDLE-END SOLUTION TO ROBUST SPEECH RECOGNITION

FIELD OF INVENTION

This invention relates to speech recognition and more particularly to Signal-to-Noise Ratio (SNR) dependent decoding and weighted Viterbi recognition.

BACKGROUND OF INVENTION

A technique of time-varying SNR dependent coding for increased communication channel robustness is described by A. Bernard, one of the inventors herein, and A. Alwan in "Joint channel decoding—Viterbi Recognition for Wireless Applications", in Proceedings of Eurospeech, Sebt. 2001, vol. 4, pp. 2703-6; A. Bernard, X. Liu, R. Wesel and A. Alwan in "Speech Transmission Using Rate-Compatable Trellis codes and Embedded Source Coding," IEEE Transactions on Communications, vol. 50, no. 2, pp 309-320, Feb. 2002.; A. Bernand and A. Alwan, "Source and Channel Coding for low bit rate distributed speech recognition systems", IEEE Transactions on Speech and Audio Processing, Vol. 10, No. 8 , pp570-580, Nov. 2202; and A. Bernard in "Source and Channel Coding for Speech and Remote Speech Recognition," Ph.D. thesis, University of California, Los Angeles, 2002.

For channel and acoustic robustness is described by X. Cui, A. Bernard, and A. Alwan in "A Noise-robust ASR back-end technique based on Weighted Viterbi Recognition," in Proceedings of Eurospeech, September 2003, pp. 2169-72.

Speech recognizers compare the incoming speech to speech models such as Hidden Markov Models HMMs to identify or recognize speech. Typical speech recognizers combine the likelihoods of the recognition features of each speech frame with equal importance to provide the overall likelihood of observing the sequence of feature vectors. Typically robustness in speech recognition is dealt with either at the front end (by cleaning up the features) or at the back end (by adapting the acoustic model to the particular acoustic noise and channel environment).

Such classic recognizers fail to differentiate between the particular importance of each individual frame, which can significantly reduce recognition performance when the importance of each frame can be quantitatively estimated into a weighted recognition mechanism.

SUMMARY OF INVENTION

In accordance with one embodiment of the present invention a procedure for performing speech recognition which can integrate, besides the usual speech recognition feature vector, information regarding the importance of each feature vector (or even frequency band within the feature vector). Applicant's solution leaves both the acoustic features and models intact and only modifies the weighting formula in the combination of the individual frame likelihoods.

In accordance with an embodiment of the present invention a method for performing time and frequency SNR dependent weighting in speech recognition includes for each period t estimating the SNR to get time and frequency SNR information $\eta_{t,f}$; calculating the time and frequency weighting to get $\gamma_{t,f}$; performing the back and forth weighted time varying DCT transformation matrix computation $MG_tM^{-1}$ to get $T_t$; providing the transformation matrix $T_t$ and the original MFCC feature $o_t$ that contains the information about the SNR to a recognizer including the Viterbi decoding; and performing weighted Viterbi recognition $b_j(o_t)$.

DESCRIPTION OF PREFERRED EMBODIMENT

Review of Time Weighted Viterbi Recognition

In general, there are two related approaches to solve the temporal alignment problem with HMM speech recognition. The first is the application of dynamic programming or Viterbi decoding, and the second id the more general forward/backward algorithm. The Viterbi algorithm (essentially the same algorithm as the forward probability calculation except that the summation is replaced by a maximum operation) is typically used for segmentation and recognition and the forward/backward for training. See for the Viterbi algorithm G. D. Forney, "The Viterbi algorithm," IEEE Transactions on Communications, vol. 61, no. 3, pp. 268-278, April 1973.

The Viterbi algorithm finds the state sequence Q that maximizes the probability P* observing the features sequence $(O=o_1, \ldots o_T)$ given the acoustic model $\lambda$ $$P^* = \max_{All Q} P(Q, O \mid \lambda). \quad (1)$$

In order to calculate P* for a given model $\lambda$, we define the metric $\phi_j(t)$, which represents the maximum likelihood of observing the features sequence $(O=o_1, \ldots o_t)$ given that we are in state j at time t. Based on dynamic programming, this partial likelihood can be computed efficiently using the following recursion $$\varphi_j(t) = \max_i \{\varphi_j(t-1)a_{ij}\}b_j(o_t). \quad (2)$$

The maximum likelihood P* $(O|\lambda)$ is then given by P* $(O|\lambda) = \max_j \{\phi_j(T)\}$.

The recursion (2) forms the basis of the Viterbi Algorithm (VA) whose idea is that there is only one "best" path to state j at time t.

Figure 1:
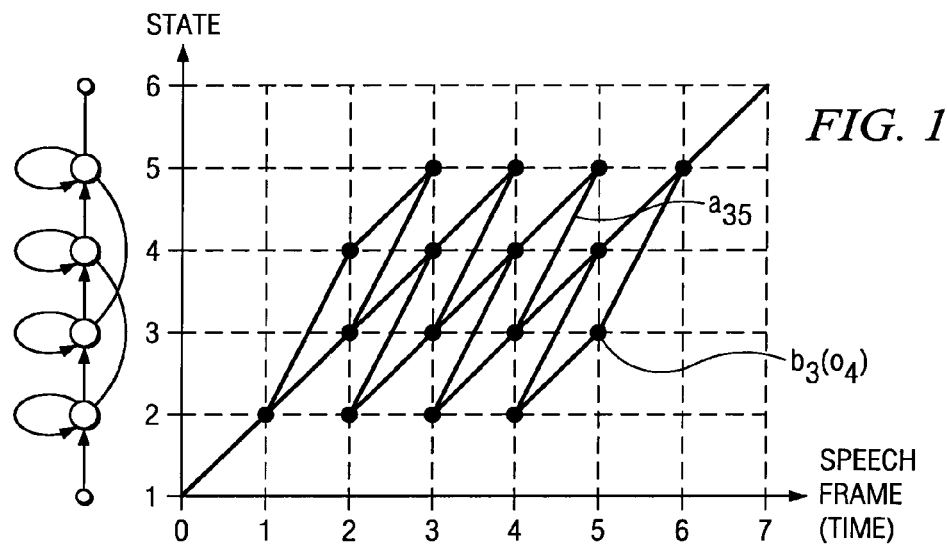
FIG. 1 is an illustration of the Viterbi algorithm for HMM speech where the vertical dimension represents the state and the horizontal dimension represents the frames of speech (i.e. time).

As shown in FIG. 1, this algorithm can be visualized as finding the best path through a trellis where the vertical dimension represents the states of the HMM and the horizontal dimension represents the frames of speech (i.e. time).

Time Weighted Viterbi Recognition (WVR)

In speech recognition, the quality of speech features can depend on many factors: acoustic noise, microphone quality, quality of communication, etc. The weighted Viterbi recognizer (WVR), presented in the "Joint Channel Decoding-Viterbi Recognion for Wireless Applications," cited above, modifies the Viterbi algorithm (VA) to take into account the quality of the feature.

The time-varying quality $\gamma_t$ of the feature vector at time t is inserted in the VA by raising the probability $b_j(o_t)$ to the power $\gamma_t$ to obtain the following state metrics update equation:

$$\varphi_{j,t} = \max_i [\varphi_{i,t-1} a_{ij}][b_j(o_t)]_t^\gamma \qquad (3)$$

where $\phi_{j,t}$ is the state metric for state j at time t and $a_{ij}$ is the state transition metric. Such weighting has the advantage of becoming a simple multiplication of log ($b_j(o_t)$) by $\gamma_t$ in the logarithmic domain often used for scaling purposes. Furthermore, note that if one is certain about the received feature, $\gamma_t=1$ and equation 3 is equivalent to equation. 2. On the other hand, if the decoded feature is unreliable, $\gamma_t=0$ and the probability of observing the feature given the HMM state model $b_j(o_t)$ is discarded in the VA recursive step.

Under the hypothesis of a diagonal covariance matrix $\Sigma$, the overall probability $b_j(o_t)$ can be computed as the product of the probabilities of observing each individual feature. The weighted recursive formula (equation 3) can include individual weighting factors $\gamma_{t,t}$ for each of the $N_F$ front-end features.

$$\varphi_{j,t} = \max[\varphi_{i,t-1} a_{ij}] \prod_{k=1}^{N_F} [b_j(o_t)]_{k,\ldots t \ldots}^\gamma \qquad (4)$$

where k indicates the index of the feature observed.

Time and Frequency WVR

In accordance with the present invention we provide an extension to the time-only weighted recognition presented in equation 3. First, we present how we can use both time and frequency weighting. Second, we present how the weighting coefficients can be obtained.

Time and Frequency Weighting

With time weighting only, the insertion of the weighting coefficient in the overall likelihood computation could be performed after the probability $b_j(o_t)$ had been computed by raising it to the power $\gamma_t$, using $\tilde{b}_j(o_t)=[b_j(o_t)]^{\gamma_t}$.

In order to perform time and frequency SNR dependent weighting, we need to change the way the probability $b_j(o_t)$ is computed. Normally, the probability of observing the $N_F$-dimensional feature vector $o_t$ in the $j^{th}$ state is computed as follows, $$b_j(o_t) = \sum_{m=1}^{N_M} w_m \frac{1}{\sqrt{(2\pi)^{N_F}[\Sigma]}} e^{-\frac{1}{2}(ot-\mu)'\Sigma^{-1}(ot-\mu)}, \qquad (5)$$

where $N_M$ is the number of mixture components, $w_m$ is the mixture weight, and the parameters of the multivariate Gaussian mixture are its mean vector $\mu$ and covariance matrix $\Sigma$.

In order to simplify notation, we should only note that $\log(b_j(o_t))$ is proportional to a weighted sum of the cepstral distance between the observed feature and the cepstral mean ($o_t-\mu$), where the weighting coefficients are based on the inverse covariance matrix ($\Sigma^{-1}$), $$\log(b_j(o_t)) \propto (ot-\mu)' \Sigma^{-1} (o_t - \mu). \qquad (6)$$

Remember that the $N_F$-dimensional cepstral feature $o_t$ is obtained by performing the Discrete Cosine Transform (DCT) on the $N_S$-dimensional log Mel spectrum (S). Mathematically, if the $N_F \times N_S$ dimensional matrix M represents the DCT transformation matrix, then we have $o_t=MS$. Reciprocally, we have $S=M^{-1} o_t$ where $M^{-1}$ ($N_S \times N_F$) represent the matrix for the inverse DCT operation.

Since usually the frequency weighting coefficients we have at hand will be in the log spectral domain (whether linear or Mel spectrum scale is not important) and not in the cepstral domain, we use the inverse DCT matrix $S=M^{-1}$ to transform the cepstral distance ($o_t-\mu$) into a spectral distance. Once in the spectral domain, time and frequency weighting can be applied by means of a time-varying diagonal matrix $G_t$ which represents the weighting coefficients $\gamma_{t,f}$, $$G_t = \text{diag}(\gamma_{t,f}) \qquad (7)$$

Finally, once the weighting has been performed, we can go back to the spectral domain by performing the forward DCT operation. All together, the time and spectral frequency weighting operation on the cepstral distance $d=(o_t-\mu)$ becomes $$\tilde{d} = MG_t M^{-1}(o_t-\mu) \qquad (8)$$

With this notation, the weighted probability of observing the feature becomes $$\tilde{b}_j(o_t) = \sum_{m=1}^{N_M} w_m \frac{1}{\sqrt{(2\pi)^{N_F}[\Sigma]}} e^{-\frac{1}{2}(ot-\mu)'(MG_tM^{-1})'\Sigma^{-1}(MG_tM^{-1})(ot-\mu)} \qquad (9)$$

which can be rewritten using a back-and-forth weighted time-varying transformation matrix $T_t=MG_tM^{-1}$ as $$\tilde{b}_j(o_t) = \sum_{m=1}^{N_M} w_m \frac{1}{\sqrt{(2\pi)^{N_F}[\Sigma]}} \mu) e^{-\frac{1}{2}(ot-\mu)'(Tt')\Sigma^{-1}(Tt)(ot-\mu)}, \qquad (10)$$

which can also resemble the unweighted equation 5 with a new inverse covariance matrix $$\tilde{\Sigma}^{-1} = T_t' \Sigma^{-1} t_t, \qquad (11)$$

$$\tilde{b}_j(o_t) = \sum_{m=1}^{N_M} w_m \frac{1}{\sqrt{(2\pi)^{N_F}[\Sigma]}} e^{-\frac{1}{2}(ot-\mu)'\tilde{\Sigma}^{-1}(ot-\mu)}$$

To conclude this part on time and frequency weighting, note that time weighting only is a special case of time and frequency weighting where $G_t=\gamma_t \cdot I$ where I is the identity matrix, which also means that the weighting is the same for all the frequencies.

Determining the Weighting Coefficients

In order to have the system performing SNR dependent decoding, we first need a time and frequency SNR evaluation. In the special case presented above, the time frequency scale is the frame based (every 10 ms) and the frequency scale is the Mel frequency scale, which divides the narrowband speech spectrum (0-4 kHz) in 25 non-uniform bandwidth frequency bins.

In that specific case, the time and frequency SNR evaluation we are using for the purpose of evaluating the presented technique is that of the ETSI Distributed Speech Recognition standard which evaluates the SNR in the time and frequency domain for spectral subtraction purposes. See ETSI STQ-Aurora DSR Working Group, "Extended Advanced Front-End (xafe) Algorithm Description," Tech. Rep., ETSI, March 2003.

Regardless of the technique used to obtain such time and frequency dependent SNR estimate, we decide to refer to such value as $\eta_{t,f}$. $\eta_{t,f}$ is the SNR at frequency f at t time. The weighting coefficient $\gamma_{t,f}$ can be obtained by performing any function which will monotonically map the values taken by the SNR evaluation (logarithmic or linear) to the interval [0,1] of the values that can be taken by the weighting coefficients $\gamma_{t,f}$. In other words, we have $$\gamma_{t,f} = f(\eta_{t,f}) \quad (12)$$

One particular instantiation of equation 12 is using a Wiener filter type equation applied on the linear SNR estimate to obtain, $$\gamma_{t,f} = \frac{\sqrt{\eta_{t,f}}}{1+\sqrt{\eta_{t,f}}},$$

which guarantees that $\gamma_{t,f}$ is equal to 0 when $\eta_{t,f}=0$ and $\gamma_{t,f}$ approaches 1 when $\eta_{t,f}$ is large.

Figure 2:
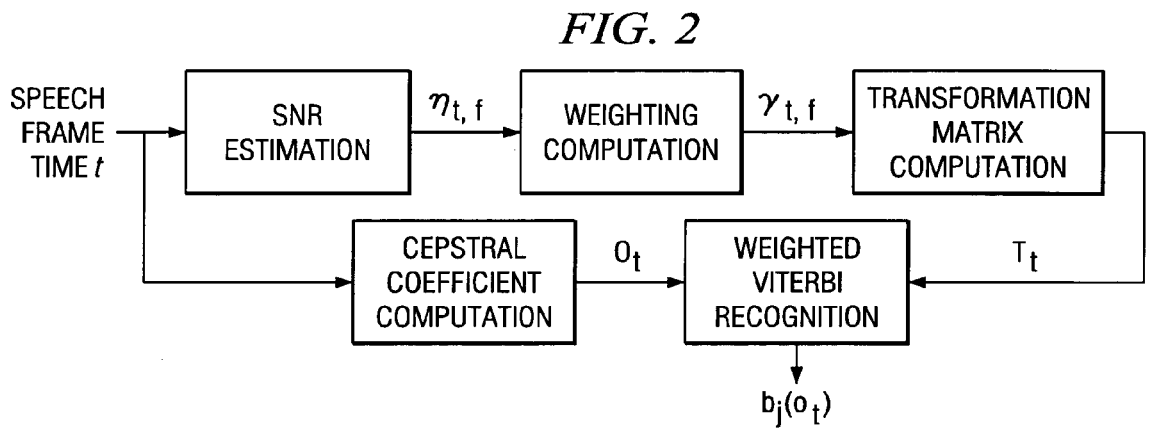
FIG. 2 is a block diagram of time and frequency SNR dependent weighted Viterbi recognition.

FIG. 2 illustrates the block diagram for the time and frequency weighted Viterbi recognition algorithm. When you have speech (speech frame t) the first step 21 is to estimate the SNR to get $\eta_{t,f}$. Then the weighting is calculated to get $\gamma_{t,f}$ at step 23. Then the transform matrix computation at step 25 is performed. This is the $MG_tM^{-1}$ to get $T_t$. The next step is Viterbi decoding at step 27 to get $b_j(o_t)$. Here the original MFCC feature $o_t$ is sent to the recognizer. The original feature contains the information about the SNR.

Performance Evaluation

Experimental Conditions

We used the standard Aurora-2 testing procedure, which averages recognition performance over 10 different noise conditions (two with channel mismatch in Test C) at 5 different SNR levels (20 dB, 15 dB, 10 dB, 5 dB and 0 dB).

As a reminder, performance is established using the following configuration: a 21-dimensional feature vector (16 Mel frequency cepstral coefficients (MFCC) features with 1$^{st}$ order derivative) extracted every 10 ms and 16 states word HMM models with 20 Gaussian mixtures per state.

Performance of Time-WVR Algorithm

Figure 3:
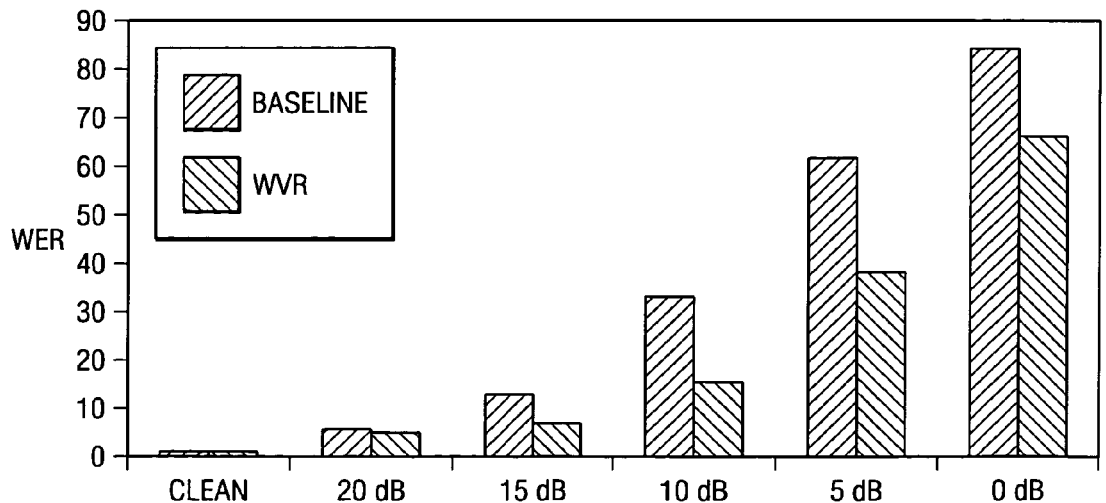
FIG. 3 illustrates the performance of t-WVR back-end on the Aurora-2 database for different SNRs.

FIG. 3 summarizes the performance of time-WVR algorithm on the Aurora-2 database. As expected, the t-WVR algorithm improves recognition accuracies mainly in the medium SNR range. Indeed, it is in the medium SNR range that the frames distinction that can be obtained by performing SNR dependent weighting is the most useful. At low (resp. high) SNR range most features are already usually bad (good).

In accordance with the present invention the weighting function can be applied in the logarithmic domain using a simple multiplicative operation. The weighting coefficient can be the output of many different important estimation mechanisms, including a frame SNR estimation, a pronunciation probability estimation, a transmission over a noisy communication channel reliability estimation, etc.

Although preferred embodiments have been described, it will be apparent to those skilled in the art that various modifications, additions, substitutions and the like can be made without departing from the spirit of the invention and these are therefore considered to be within the scope of the invention as defined in the following claims.

The invention claimed is:

1. A method for recognizing speech by determining the likelihood of observing a feature vector $o_t$ of a speech signal employing time and frequency Signal-to-Noise Ratio (SNR) dependent weighting, said method comprising the steps of:
   receiving a speech signal;
   for each time period t of the speech signal, estimating the SNR to get time and frequency SNR information $\eta_{t,f}$;
   calculating the time and frequency weighting to get weighting coefficient $\gamma_{t,f}$, wherein $\gamma_{t,f}$ is a function of $\eta_{t,f}$;
   using an inverse Discrete Cosine Transform (DCT) matrix $M^{-1}$ to transform a cepstral distance $(o_t-\mu)$ associated with the speech time period t to a spectral distance;
   computing a weighted spectral distance by applying time and frequency weighting to the spectral distance employing a time-varying diagonal matrix $G_t$ which represents the weighting coefficient $\gamma_{t,f}$;
   transforming the weighted spectral distance to a weighted cepstral distance employing a forward DCT matrix M;
   calculating a likelihood of observing the feature vector $o_t$ by employing the weighted cepstral distance in a probability function $b_j(o_t)$; and
   performing speech recognition of the speech signal employing the probability function $b_j(o_t)$ that is both time and frequency weighted.

2. The method of claim 1 wherein $$\gamma_{t,f} = \frac{\sqrt{\eta_{t,f}}}{1+\sqrt{\eta_{t,f}}},$$

which guarantees that $\gamma_{t,f}$ is equal to 0 when $\eta_{t,f}=0$ and $\gamma_{t,f}$ approaches 1 when $\eta_{t,f}$ is large.

3. The method of claim 1 wherein the performing speech recognition includes employing a Viterbi algorithm.

4. The method of claim 1 wherein the estimating the SNR to get time and frequency SNR information $\eta_{t,f}$ is a pronunciation probability estimation.

5. The method of claim 1 wherein the estimating the SNR to get time and frequency SNR information $\eta_{t,f}$ is a transmission over a noisy communication channel reliability estimation.

6. A method for recognizing speech by determining the likelihood of observing a feature vector $o_t$ of a speech signal employing time and frequency Signal-to-Noise Ratio (SNR) dependent weighting, said method comprising the steps of:
   receiving a speech signal;
   for each speech frame t of the speech signal, estimating SNR to get time and frequency SNR information $\eta_{t,f}$;
   calculating the time and frequency weighting to get weighting coefficient $\gamma_{t,f}$, wherein $\gamma_{t,f}$ a function of $\eta_{t,f}$;
   transforming a cepstral distance $(o_t-\mu)$ associated with the speech frame t to a spectral distance;
   computing a weighted spectral distance by applying time and frequency weighting to the spectral distance employing a time-varying diagonal matrix that represents the weighting coefficient $\gamma_{t,f}$;

transforming the weighted spectral distance to a weighted cepstral distance;

calculating a likelihood of observing the feature vector $o_t$ by employing the weighted cepstral distance in a probability function $b_j(o_t)$; and performing speech recognition of the speech signal employing the probability function $b_j(o_t)$ that is both time and frequency weighted.

7. The method of claim 6 wherein the performing speech recognition includes employing a Viterbi algorithm.

8. The method of claim 6 wherein the estimating the SNR to get time and frequency SNR information $\eta_{t,f}$ is a pronunciation probability estimation.

9. The method of claim 6 wherein the estimating the SNR to get time and frequency SNR information $\eta_{t,f}$ is a transmission over a noisy communication channel reliability estimation.

10. A method of determining a likelihood of observing a feature vector $o_t$ in a speech model, comprising:

receiving a speech signal;

estimating a Signal-to-Noise Ratio (SNR) for each unit t of a feature vector $o_t$ of said speech signal to obtain time and frequency SNR information;

determining a transformation matrix $T_t$ based on said time and frequency SNR information;

weighting a combination of said feature vector $o_t$ and a speech model parameter $\mu$ by said transformation matrix $T_t$ to obtain a weighted cepstral distance $T_t(o_t-\mu)$; and employing said weighted cepstral distance $T_t(o_t-\mu)$ that is both time and frequency weighted in a probability function $b_j(o_t)$ to determine a likelihood of observing said feature vector $o_t$.

11. The method of claim 10 wherein said unit t represents a frame t of said feature vector $o_t$.

12. The method of claim 10 wherein said unit t represents a time period t of said feature vector $o_t$.

* * * * *